June 8, 1965 R. F. ONSRUD ETAL 3,187,634
ROUTER SHAPER
Filed April 17, 1963 4 Sheets-Sheet 4
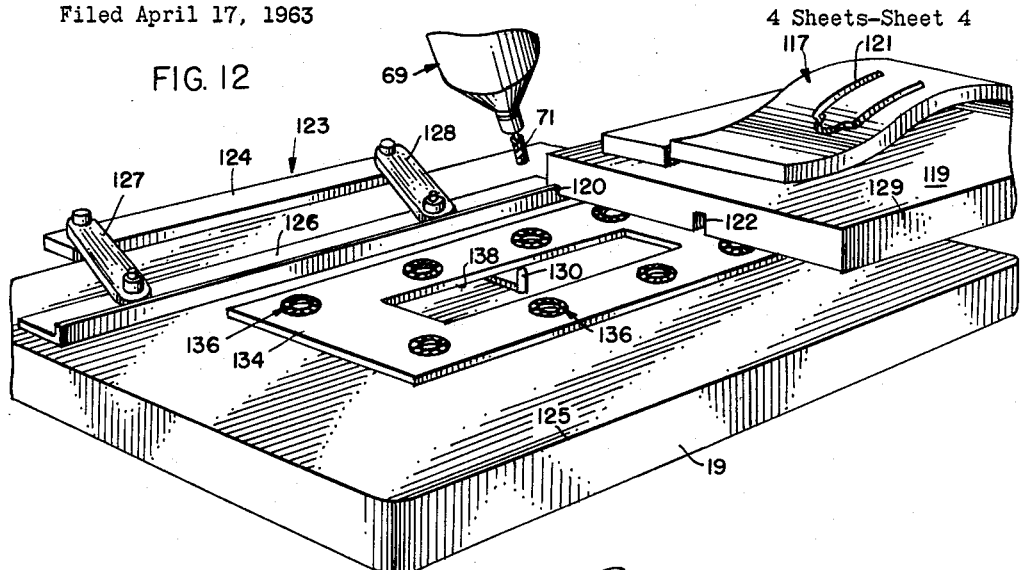
FIG. 12
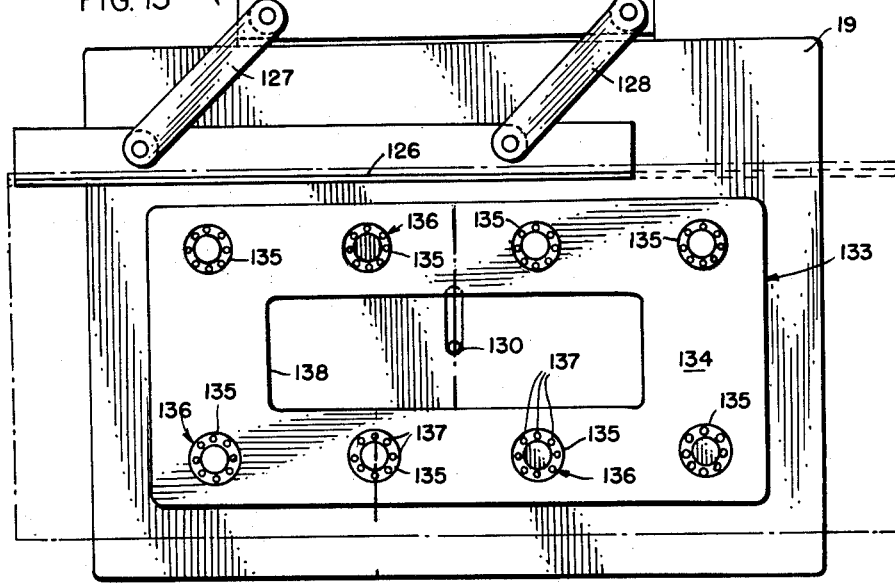
FIG. 13
FIG. 14
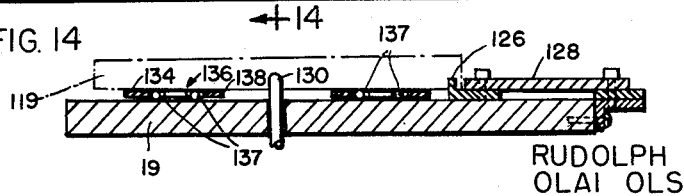
INVENTORS:
RUDOLPH F. ONSRUD
OLAI OLSEN
BY
ATT'YS

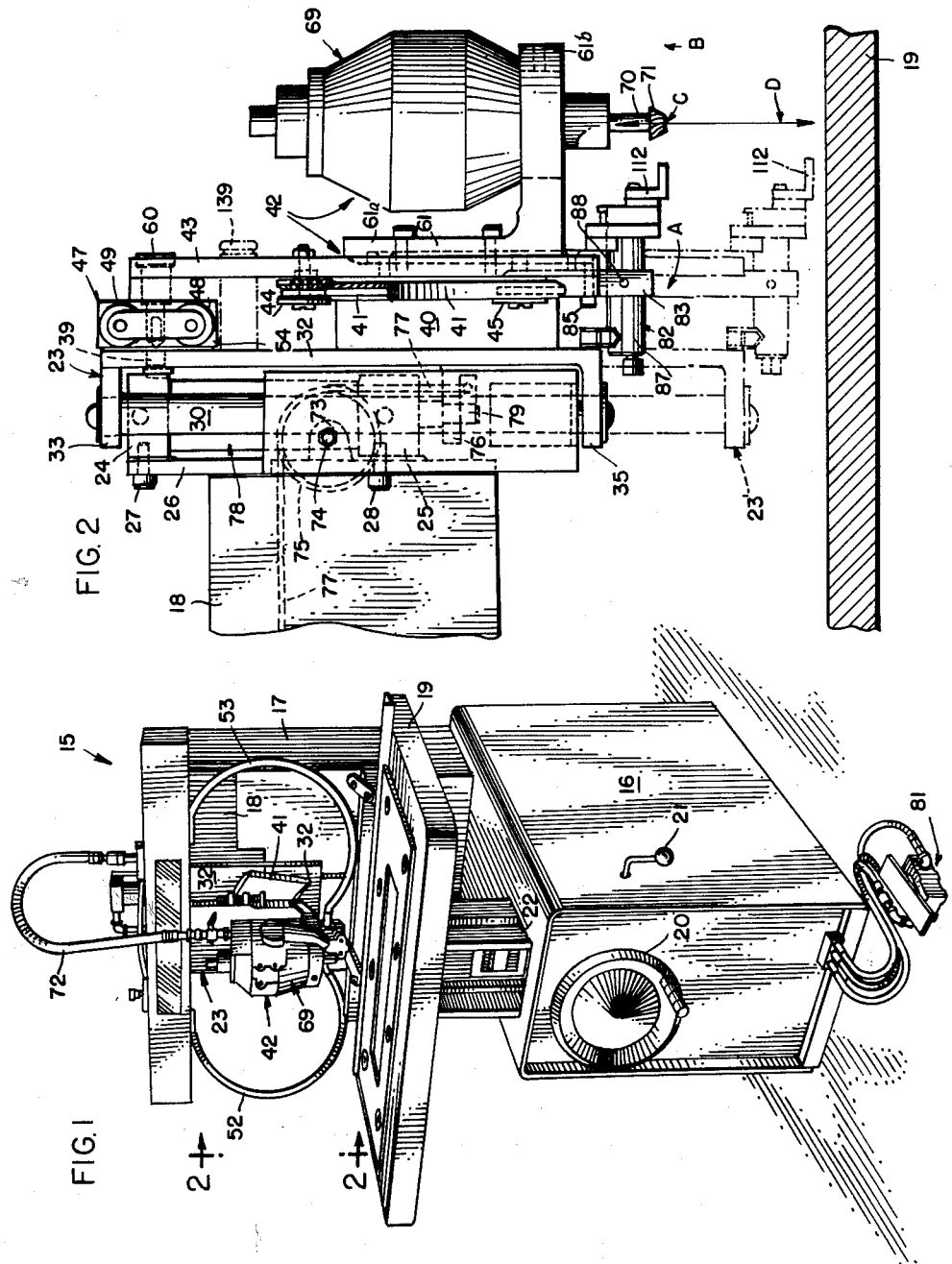

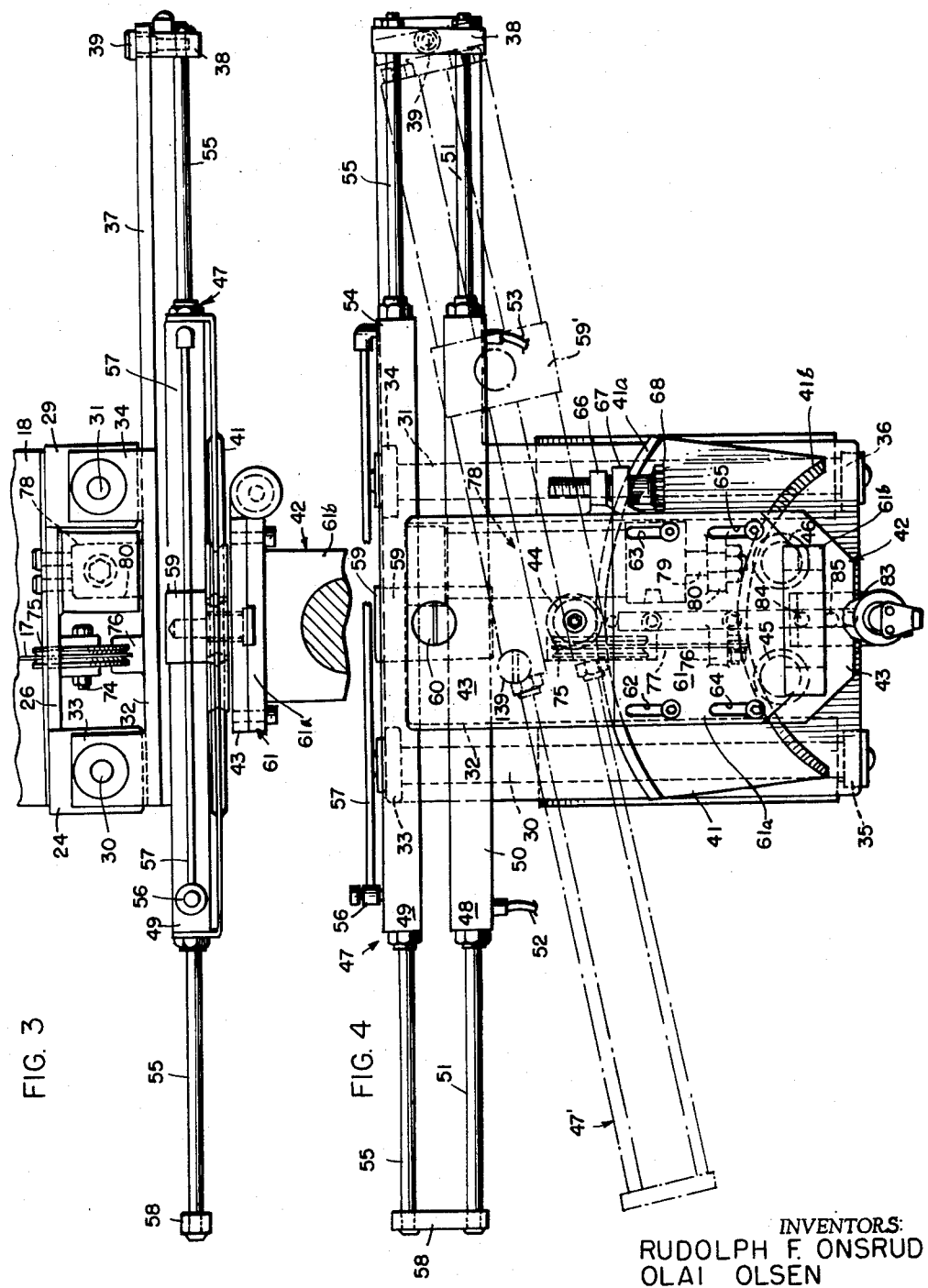

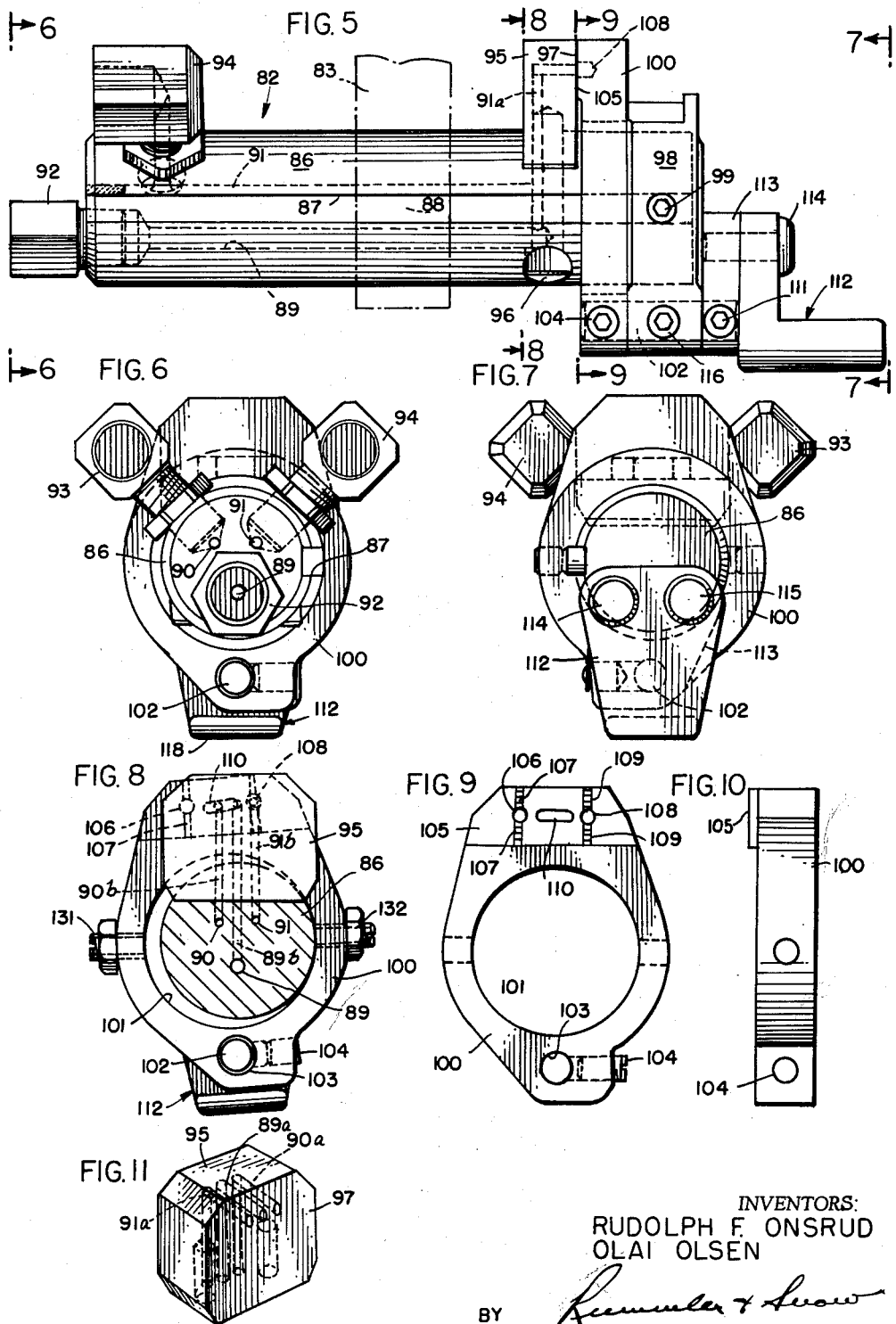

United States Patent Office 3,187,634
Patented June 8, 1965

3,187,634
ROUTER SHAPER
Rudolph F. Onsrud, Niles, and Olai Olsen, Park Ridge, Ill., assignors to Onsrud Machine Works, Inc., Niles, Ill., a corporation of Illinois
Filed Apr. 17, 1963, Ser. No. 273,682
8 Claims. (Cl. 90—11)

This invention relates to improvements in a router shaper tool machine. More in particular this invention relates to a router shaper having a highly sensitive means for automatically maintaining the axis of the rotating cutter always normal or perpendicular to the tangent line at the point of contact with the variably curved surface of the workpiece. Also in particular this invention relates to antifriction means for supporting the workpiece and guiding it horizontally into the cutter without pivotal or torsional movement.

In the manufacture of curved products such as decorative picture frames, furniture and the like, router shaper machines have been employed for such purposes. Now it is apparent that if the spindle with its associated cutter is always vertically positioned the depth and quality of the cut varies as a function of the shape of the surface of the workpiece at the cutting point. Numerous means for inclining the axis of the cutter spindle so that it would maintain itself approximately perpendicular to the tangent of the curved workpiece at the point of contact have been developed. However in such devices the sensitivity to changes in inclination was either poor or conversely so rapid that "hunting" occurred. In either case the quality of cut was inferior particularly in commercial production of such products.

Another difficulty resulting in inferior quality of cutting in router shaper operations is when appreciable friction is encountered in the horizontal movement of the workpiece during the cutting operation. For the best quality cutting the workpiece should be moved smoothly into the cutter. Further, any torsional or pivotal movement of the workpiece during cutting should be avoided as such movement will adversely affect the depth and quality of cut.

In order to overcome the above mentioned difficulties it is a prime object of this invention to provide a router shaper having a rapidly responsive means for accurately maintaining the cutter spindle perpendicular to the tangent line at the point of contact with a workpiece.

A further important object of this invention is to provide a highly sensitive means for maintaining the cutter spindle of a router shaper perpendicular to the tangent line at the point of contact of a workpiece without vibrational "hunting" movement.

A yet further important object of this invention is to provide a router shaper with a pneumatic-hydraulic mechanism of highly sensitive and rapidly responsive character for automatically positioning the cutter spindle perpendicular to the tangent line of a curved surface workpiece at the point of contact for uniform depth and high quality cutting.

Another important object of the present invention is to provide a router shaper with anti-friction means for supporting and smoothly moving a workpiece into cutting engagement with a cutter positioned with means according to the preceding objects thereby improving the quality of cut.

Still another important object of the present invention is to provide a router shaper with articulated guide means for preventing pivotal or torsional movement of a workpiece during cutting operation by the cutter positioned according to preceding claims.

These and other desirable objects inherent in and encompassed by the invention will be more readily understood from the ensuing description of a preferred embodiment of the invention, the appended claims and the annexed drawings wherein:

FIGURE 1 is a perspective view of a router shaper embodying the present invention;

FIG. 2 is an end view, partly in section and partly broken away taken on line 2—2 of FIGURE 1, showing the construction of the support and drive means of the invention for the cutting element;

FIG. 3 is a plan view, partly in section and partly broken away, illustrating the support means of FIGURE 2;

FIG. 4 is a front view of the support means of FIGURE 3 showing further details thereof but omitting the motor;

FIG. 5 is a view, in assembled form, showing the arrangement of the fluid servo-valve for controlling the angular displacement of the cutting element and its drive means;

FIG. 6 is an end view of the servo-valve taken on line 6—6 of FIGURE 5 showing the fluid connections thereto;

FIG. 7 is an end view, opposite to that of FIGURE 6, of the servo-valve taken on line 7—7 of FIGURE 5 showing the position of the sensing shoe for controlling operation of the servo-valve;

FIG. 8 is a cross-sectional view, taken on line 8—8 of FIGURE 5, showing further details of the servo-valve assembly;

FIG. 9 is an end view of a valve member of the servo-valve;

FIG. 10 is a side view of the valve member of FIGURE 9;

FIG. 11 is a perspective view of another valve member of the servo-valve of FIGURE 5 showing the shape and porting details thereof;

FIG. 12 is a perspective view, partly broken away, showing the bed of the router shaper showing a workpiece supported on anti-friction means and guided into the cutting element by an articulated guide means according to this invention;

FIG. 13 is a plan view of FIGURE 12, partly in section and partly broken away, illustrating details of the anti-friction and articulated guide means; and FIG. 14 is a sectional view taken on line 14—14 of FIGURE 13 showing further details of the anti-friction and articulated guide means.

Referring to the drawings in FIGURE 1 a router shaper is indicated generally by the numeral 15. The router shaper 15 includes a stationary base 16 having an upwardly extending stationary member 17 on the rearward end. The stationary member 17 includes a forwardly extending hollow cantilever beam 18. Supported on the base 16 is a bed or table 19 connected to column 22 which is vertically movable by conventional means such as by suitable gear and ratchet means (not shown) operated by handwheel 20. For preventing any vertical movement of the bed 19 after pre-setting, conventional locking means (not shown) operated by lever 21 may be provided.

Supported by the beam 18 at the forward end thereof is a carrier indicated generally at 23 which is movable only in a vertical direction in a floating manner as is conventionally known. As shown in FIGURES 2, 3 and 4 this may comprise a first pair of vertically aligned bearing blocks 24 and 25 rigidly connected to a stationary plate 26 as by bolts, two of which are shown at 27 and 28. The plate 26 is rigidly mounted on the forward end of the cantilever beam 18 by conventional means such as by welding. A second pair of vertically aligned bearing blocks, one of which is shown at 29 in FIGURE 3, are positioned in horizontal spaced relation with respect to bearing blocks 24 and 25 as evident from FIGURES 2 and 3. The bearing blocks 24 and 25 are provided with vertically aligned bores for receiving in slidable relation the rod 30. Similarly the second pair of bearing blocks are also provided with vertically aligned bores for receiving in slidable relation the rod 31 positioned parallel to the rod 30. Rigidly connected to the ends of rods 30 and 31 is a vertically extending bracket plate 32 having at the corner portions thereof four rearwardly extending lobes 33, 34, 35 and 36. The lobes 33 and 35 are rigidly connected to the ends of rod 30 and lobes 34 and 36 are rigidly connected to the ends of the rod 31. Thus it is apparent that the bracket plate 32 is movable in a vertical direction with respect to the beam 18 and bed 19.

Secured rigidly to the upper end portion of the bracket plate 32 and extending rightwardly thereof as viewed in FIGURE 3 is an arm 37 pivotally supporting a bracket 38 at 39 for a purpose to be described later.

Rigidly mounted on the lower portion of the bracket plate 32 is a forwardly extending projection 40. Secured rigidly to the forward end of projection 40 is a slide-way element 41 which is constructed from a flat plate with an upper slide surface or track 41a and lower camming surface or track 41b as best seen in FIGURE 4. The tracks 41a and 41b are arcuate portions of concentric circles having their common center at point A in FIGURE 2 on forwardly extending transverse cutting axis B.

From the foregoing it will now be appreciated that the carrier 23, limited to vertical movement only, includes the bracket plate 32 and its associated arm 37, projection 40 and its associated slide-way element 41. In FIGURE 2 the vertical movement of the carrier 23 is indicated in dotted lines at 23'. The motor carriage indicated generally at 42 is supported by the carrier 23, the details of which will now be described.

A vertically extending mounting plate 43 is provided with three roller elements 44, 45 and 46, the latter being shown in dotted lines in FIGURE 4. The upper roller element 44, positioned on the rearward side of the mounting plate 43, is in rolling relation with the upper track 41a of slide-way 41 and thus supports the mounting plate 43. The lower roller elements 45 and 46, also positioned on the rearward side of mounting plate 43, are in rolling relation with the lower track 41b of the slide-way 41. As noted in FIGURE 4 the rollers 44, 45 and 46 are in triangular relation with respect to each other and therefore the mounting plate 43 is supported by and movable arcuately on the slide-way 41. The means for selectively controlling the angular displacement of the mounting plate 43 with respect to the vertical will now be described.

Referring to FIGURE 4 it will be seen that there is a fluid device, generally indicated at 47, comprising two parallel disposed fluid cylinders 48 and 49. The lower cylinder 48 includes a casing 50 having a slidable piston therein (not shown) with a connecting rod 51 protruding through both ends of the casing 50 as shown. Adjacent the left end of the casing 50 there is provided a flexible hose 52 communicatively connected to the left end chamber of the cylinder 48 in a conventional manner. Likewise adjacent the right end of casing 50 there is provided a flexible hose 53 communicatively connected to the right end chamber of the cylinder 48 in a conventional manner. Thus it is apparent that by appropriately charging one of the hoses 52, 53 with fluid under pressure and exhausting the other, axial displacement of the casing 50 with respect to connecting rod 51 occurs. In the preferred embodiment the cylinder 48 is energized pneumatically but it should be understood that hydraulic fluid may be employed if desired.

The cylinder 49 is, in effect, a dashpot. In the preferred embodiment the cylinder 49 employs hydraulic fluid but it should be understood that an elastic fluid may be used if desired. The cylinder 49 includes a casing 54, parallel to casing 50, having a piston (not shown) with a connecting rod 55 protruding from both ends thereof as shown in FIGURE 4. Adjacent the left end of casing 54 is a valve 56 in communicative relation with the left cylinder chamber in casing 54. Also in communicative relation with the right cylinder chamber in casing 54 is a by-pass conduit 57 which conduit is communicatively connected with the valve 56 as indicated in FIGURES 3 and 4. The valve 56 should preferably be adjustable and may be conveniently a conventional needle valve. From this it is apparent that for a given force the rate of movement of the cylinder 49 is limited by the viscosity of the fluid employed and the orifice permitted by the setting of the valve 56 for, as well known in such dashpots, the fluid must flow from one cylinder chamber to the other through the by-pass conduit 57. The valve 56 therefore regulates the flow through the by-pass conduit 57.

The left ends of the connecting rods 51 and 55, as viewed in FIGURE 4, are rigidly secured together in parallel relation by bracket 58. Likewise the rightward ends of connecting rods 51 and 55 are rigidly secured in parallel relation to the ends of bracket 38. Thus the connecting rods 51 and 55 are rigidly connected together in parallel relation. The casings 50 and 54 are also secured rigidly to each other in parallel spaced relation by the block 59. At this point it will become apparent that when cylinder 48 is energized the casings 50 and 54 move axially along their respective connecting rods 51 and 55 because the bracket 38 is pivotally supported by the stationary arm 37 as previously described.

The block member 59 at a point between the cylinders 48 and 49 is pivotally connected at 60 to the upper end portion of the mounting plate 43. Since the fluid device 47 with its cylinders 48 and 49 are connected to stationary pivot 39 at the right end thereof, as viewed in FIGURE 4, it follows that energizing of cylinder 48 moves the block 59 arcuately in a circular path concentric about the axis B (FIGURE 2) fixed by the slide-way 41. Thus, for example, if the flexible hose 53 is charged with fluid under pressure the right cylinder chamber of cylinder 48 is energized which moves the block 59 to a position such as 59' shown in dotted lines in FIGURE 4. Because of the articulate arrangement of the fluid device 47 it will swing arcuately about its stationary pivot 39 to the position 47' shown in phantom lines in FIGURE 4. Since the block 59 has moved to position 59' the mounting plate 43 and its rollers 44, 45, and 46 are angularly displaced from the vertical about the axis B as fixed by the slide-way 41.

From the foregoing it can be seen that by controlling the fluid device 47 the angular displacement of the mounting plate 43 may be correspondingly controlled. The means for controlling the fluid device 47 will be described later herein. Further construction details of the motor carriage 42 will now be described.

Secured to the mounting plate 43 is an angle bracket 61 having a vertical plate portion 61a and a forwardly projecting horizontal plate portion 61b at right angles as shown best in FIGURE 2. The vertical plate portion 61a is provided with four slots 62, 63, 64 and 65 as shown in FIGURE 4. Suitable bolts extending through the slots 62, 63, 64 and 65 secure adjustably the angle bracket 61 to the mounting plate 43. For convenience in making small adjustments prior to tightening the bolts in the slots 62, 63, 64 and 65, the mounting plate 43 is provided with a lobe 66 and in alignment therewith is a lobe 67 on the angle bracket 61 as seen in FIGURE 4. The lobe 66 is provided with threads to receive adjustment screw 68 as shown. Thus with the bolts in the slot 62, 63, 64 and 65 loosened, the adjusting screw 68 may be rotated to adjust the relative position of the angle bracket 61 with respect to the mounting plate 43. Thereafter the bolts in the slots 62, 63, 64 and 65 are tightened thus securing rigidly the angle bracket 61 with respect to the mounting plate 43. The purpose of this adjustability is important which will later become apparent herein.

Secured in support relation to the horizontal plate portion 61b of the angle bracket 61 is a conventional motor 69 having its rotating spindle 70 protruding below the horizontal plate portion 61b of angle bracket 61 as seen best in FIGURE 2. Secured to the lower end of the spindle 70 is a conventional cutter element indicated at 71. The motor 69 shown in the drawings is of the conventional turbine type pneumatically energized through flexible hose 72 shown in FIGURE 1 leading to a source of compressed air (not shown). However it should be understood that the motor 69 may be optional in type, as may be desired, such as an electric motor. The rotating axis of spindle 70 is always positioned perpendicular or normal to axis B of FIGURE 2 irrespective of the angular displacement of the motor carriage 42 and the bottom of the cutter element 71 should be positioned substantially at the intersection of axis B with the rotating axis of the spindle 70. Because of the variable sizes of cutter elements 71 the position of the angle bracket 61 supporting the motor 69 must be adjustable which adjustment is accomplished by the bolts in slots 62, 63, 64, 65 and adjusting screw 68 as previously described. From this it is apparent that the motor carriage 42 may be angularly displaced arcuately so that the axis of the rotating spindle 70 pivots about its intersection with axis B shown at point C in FIGURE 2.

From the foregoing it should be apparent that since the motor 69 and its motor carriage 42 is supported by carrier 23 the entire assembly is vertically movable with the bracket plate 32 as previously explained. This has the effect of shifting the horizontal axis B and its associated points A and C in a vertical direction indicated by the vertical arrow D in FIGURE 2 through a range in distance limited by the length of the vertical rods 30 and 31 previously described. Now since the weight of the entire assembly slidable vertically on the rods 30 and 31 is appreciable, a conventional control mechanism is employed which is briefly described below.

Within the hollow portion of the cantilever beam 18 a pair of horizontally aligned ears, one of which is shown at 73 in dotted lines in FIGURE 2, is provided. A horizontal shaft 74 supported by ears 73 carries rotatably a pulley 75 as seen in dotted lines in FIGURES 2 and 4 and in full lines in FIGURE 3. The bracket plate 32 is provided with a rearwardly extending lug 76 shown in dotted lines in FIGURES 2 and 4 and in full lines in FIGURE 3. The lug 76 is secured to one end of a flexible element such as a cable 77 as shown in FIGURES 2, 3 and 4. The cable 77 passes over the top of pulley 75 and extends rearwardly as indicated in FIGURE 2. Another pulley (not shown) is mounted in the stationary member 17 over which the cable 77 passes and is connected to a counterweight (not shown). The counterweight should be sufficient to overcome slightly the aggregate weight of the carrier 23, motor carriage 42 and motor 69 so that the entire assembly would, if not otherwise prevented, floatingly rise vertically to its upper limit. In other words the counterweight should be adjusted so that a relatively small force is required to move the motor 69 and its associated assembly in a downward direction. Conventional means for providing controllably this downward force for lowering the motor 69 and its associated assembly will now be briefly described.

Mounted on stationary plate 26 in vertical relation is a cylinder and piston unit, generally indicated at 78 as best seen in dotted lines in FIGURE 4, which has a downwardly extending connecting rod 79 secured to a rearwardly extending lug 80 rigidly connected to the rearward side of the bracket plate 32. Thus energizing of the cylinder 78 forces the bracket plate 32 downwardly and therefore motor carriage 42 and motor 69 assembly correspondingly move downwardly against the action of the counterweight pulling on the cable 77. Since but moderate forces are required during operation, the energizing pressures required for cylinder 78 are not great. Although hydraulic pressure may be employed, the cylinder 78 of the embodiment shown is pneumatically energized under the control of the pedal operated valve generally indicated at 81 (FIGURE 1) in a conventional manner. The means for automatically controlling the angular displacement of the motor carriage 42 will now be described.

Referring now to FIGURE 2 there is shown a servo-valve indicated generally at 82 which is shown enlarged in FIGURE 5. The servo-valve 82 is supported by a bracket 83 bolted to the rearward side of the mounting plate 43 as by bolts 84 and 85 as seen in FIGURES 2 and 4. The depending end portion of the bracket 83 is collar shaped adapted for slidable reception of the cylindrical body 86 of the servo-valve 82. The body 86 is provided with a longitudinal extending keyway 87 positioned for receiving a conventional set screw threaded into the transverse bore 88 in the collar shaped lower portion of bracket 83. This arrangement permits horizontal adjustment of the body 86 with respect to the bracket 83. However, during operation the set screw in the bore 88 rigidly holds the body 86 to the bracket 83.

The body 86 is provided with three longitudinal fluid passages 89, 90 and 91. The passage 89 communicates with a source of fluid pressure (e.g. compressed air) through conventional fitting 92 and flexible hose (not shown). The passage 90 communicates with the right end chamber of cylinder 48 of the fluid device 47, as viewed in FIGURE 4, through fitting 93 (FIGURE 6) and flexible hose 53 (FIGURE 4). The passage 91 communicates with the left end chamber of the cylinder 48 through fitting 94 and flexible hose 52.

In FIGURES 5, 8 and 11 there is shown a valve block 95 which is secured rigidly to the body 86 by bolts, one of which is shown at 96 in FIGURE 5. The valve block 95 is provided with three fluid passages 89a, 90a and 91a which communicate respectively with passages 89, 90 and 91 through transverse connecting passages 89b, 90b and 91b. It will be seen from FIGURE 11 that the passages 89a, 90a and 91a lead to a flat smooth valve face 97 in a plane perpendicular to the longitudinal axis of the body 86.

Forwardly of the above described valve block 95 is a collar member 98 which is adjustably secured to the body 86 by transverse set screw 99 to the keyway 87. Thus the collar member 98 may slide along the body 86 until the set screw 99 is tightened at which time the collar member 98 is rigidly secured to the body 86. During operation the collar member 98 is rigidly secured to the body 86.

Disposed between the valve block 95 and collar member 98 in transversely slidable relation is a movable valve element 100 which element is shown in detail in FIGURES 9 and 10. The bore 101 in the valve element 100 is larger than the diameter of the valve body 86 as is evident from FIGURE 8. The valve element 100 is pivotally supported by the collar member 98 by a longitudinally disposed pin 102 journalled for rotation in a bore positioned on the lower portion of the collar member 98 as best seen in FIGURE 5. The pin 102 is rigidly secured to aligned bore 103 in the lower end of the valve element 100 by set screw 104. Thus as seen in FIGURE 8 the valve element 100 may rock from side to side about the axis of the pin 102 and the pin 102 being secured to the valve element 100 rocks in the bore of the collar member 98.

Referring now to FIGURES 5, 9 and 10, it will be seen that the valve element 100 is provided with a smooth flat valve face 105 which co-operates with and is slidable on the valve face 97 of valve block 95. In communication with the valve face 105 of valve element 100 is an exhaust recess 106 which recess is also in communication with the atmosphere through vertical groove 107. Also in communication with the valve face 105 of valve element 100 is a second exhaust recess 108 in communication with the atmosphere through a second vertical groove 109. Positioned between the exhaust recesses 106 and 108 is an elongated recess 110. Now referring to FIGURES 5 and 8 it will be seen that the elongated recess 110 is always in registry with the source of fluid pressure in passage 89a of the valve block 95. Thus the elongated recess in the elongated recess 110 is always charged with fluid pressure. When the valve element 100 is rocked about its pivot pin 102 to the position shown in FIGURE 8 it will be seen that the elongated groove 110 is in registry with passage 90b in valve block 95 which communicates fluid under pressure to energize the right cylinder chamber of cylinder 48 of the fluid device 47. Meanwhile the recess 108 registers with passage 91b for exhausting to the atmosphere the left chamber of cylinder 48 of the fluid device 47. Thus as shown in FIGURE 8 the fluid device 47 of FIGURE 4 is energized to move the block 59 toward the position 59' shown in phantom lines. Now if the valve element 100 is rocked clockwise to its opposite limit from that of FIGURE 8 the fluid device 47 will be energized for movement in the opposite direction for the pressurized elongated recess 110 then registers with passage 91b while exhaust recess 106 registers with passage 90b. However, it will be noted from FIGURE 8 that when the valve element 100 is in its mid-position (neutral) neither of passages 90b or 91b is pressurized nor exhausted, thus holding the fluid device fixedly. The valve element 100 is provided with a pair of opposed adjusting screws 131 and 132 (FIGURE 8) for limiting the arcuate movement of the valve element 100 with respect to the body 86 so that valving registry as described above may conveniently be attained.

Secured to the forward end of the pin 102 by set screw 111 (FIGURE 5) is a shoe plate 113. Thus the shoe plate 113 is constrained to move rotatively with the valve element 100. Removably secured as by bolts 114 and 115 (FIGURE 7) is a sensing shoe 112 which projects forwardly as indicated in FIGURE 5. From this it will be apparent that rotative movement of the sensing shoe 112 about the axis of pivot pin 102 also correspondingly moves or actuates the valve element 100 of the servo-valve 82. The transverse bore in the collar member 98 covered by cap 116 is to lubricate the journalled pin 102 therein.

In operation the curved workpiece (FIGURE 12) is moved horizontally and the upper surface thereof engages the lower surface of the sensing shoe 112. The sensing shoe 112 necessarily moves rotatively so that its bottom surface 118 conforms to the tangent line at the point of cutting by the cutter element 71. This movement actuates the valve element 100 to energize the fluid device 47 in a direction to shift the angular displacement of the motor carriage 42 until the spindle 70 of the motor 69 is perpendicular or normal to the tangent line of the curved surface of workpiece 117 at the point of cutting. When the motor carriage 42 has shifted its angular displacement sufficiently the servo-valve 82 reverts to neutral position for the servo-valve 82 is fixed to the motor carriage 42. In other words the sensing shoe 112 actuates the valve element 100 and the fluid device 47 shifts the motor carriage 42 including valve body 86 and its associated valve block 95 until the valve block 95 reaches the neutral position with respect to valve element 100. Thus movement of sensing shoe 112 causes energizing of the fluid device 47 in a direction to move valve block 95 to its neutral position with respect to valve element 100. However, the rate at which the fluid device 47 moves upon energization is adjustably controlled through setting of needle valve 56 of the dashpot cylinder 49 as previously described. By proper adjustment of the needle valve 56 the sensitivity of the fluid device 47 to alter the angular displacement of the motor carriage 42 in response to the actuation of the servo-valve 82 is remarkably high without over-displacement or "hunting" vibrations. However, in order to take full advantage of the highly sensitive actuation above described it is important that the workpiece 117 be moved at a smooth or uniform rate of horizontal motion and devoid of torsional or pivotal movement. The means for accomplishing this according to this invention will now be described.

Referring now to FIGURE 12 it will be seen that the workpiece is supported by a bed plate 119 having a straight longitudinal groove 120 on the underside thereof. In addition where lateral movement of the workpiece 117 is required to obtain a particular design in the cut such as the shape of the groove 121, a second groove 122 having the requisite curvature is made in the underside of bed plate 119 as shown.

Mounted on the table 19 is an articulated guide device indicated generally at 123 in FIGURES 12 and 13. The guide device 123 comprises a bar 124 secured to the table 19 in parallel relation to the front edge 125 of table 19. Positioned in parallel relation to the bar 124 is a guide rail 126. The guide rail 126 may have an L-shaped cross-section as indicated in FIGURE 12. The rail 126 is connected to the bar 124 by a pair of parallel disposed links 127 and 128 in pivotal relation. Thus the links 127 and 128 may move arcuately about their pivot connections on the bar 124 but the parallelogram relation of links 127 and 128 with rail 126 and bar 124 will always exist. Therefore the rail 126 always remain parallel with the bar 124 but the distance between them is variable. The groove 120 in bed plate 119 engaged with rail 126 therefore permits movement of the bed plate 119 in any horizontal direction but cannot be torsionally moved or in other words the edge 129 of the bed plate 119 is always parallel to the edge 125 of the table 19. The upwardly extending guide pin 130 is adjustably fixed in rigid relation with the table 19 and positioned to be registrable for engagement with the curved groove 122 which guides the transverse or lateral movement of bed plate 119 in accordance with predetermined requirements of cutting design in the workpiece 117. Anti-friction means for supporting the bed plate 119 will now be described.

Referring now to FIGURES 13 and 14 the numeral 133 indicates a rollable support which is rollable on the table 19. The rollable support 133 comprises a plate member 134 having a plurality of bores 135 suitably disposed as indicated in FIGURE 13. Secured in press-fit relation within each of the bores 135 is a ball-bearing race indicated generally at 136. The race 136 is of conventional construction comprising an outer annular ring and a cage ring in concentric relation whereby the balls 137 are retained in circumferential spaced relation in a well known manner. Each of the balls 137 are of diameter greater than the thickness of the plate member 134 and positioned centrally so that a portion of each ball 137 projects above the plate member 134 and also a portion of each ball extends below the plate member 134. From this it is apparent that the balls 137 rollably support the bed plate 119, carrying the workpiece 117, on the table 19 and the plate member 134 retains the balls 137 in their relative positions with respect to each other. It will be also apparent that the rollable support 133 may roll horizontally in any direction but its linear movement is only one-half the distance of the bed plate 119.

Disposed in the central portion of the plate member 134 is an opening 138 of generally rectangular shape through which the guide pin 130 extends. The opening 138 thus permits the rollable support 133 to move in any direction on the table 19 for distances limited by the engaging of the guide pin 130 with the inner edges of opening 138 in the plate member 134 thereby preventing rollable support 133 from moving off of the table 19.

From the foregoing it is apparent that the bed plate 119, carrying the workpiece 117, co-operates with the rollable support 133 and the articulated guide device whereby the workpiece 117 is guided into the cutter element 71 without pivotal or torsional movement and is supported by anti-friction means in the form of rollable support 133 so that the rate of feed of workpiece to the cutter element is smooth and steady.

In the event that it is desired to employ the router shaper 15 for other purposes, such as a drill press, a removable bolt 139 shown in phantom lines in FIGURES 2 and 3 is provided. With the motor carriage 42 in vertical position the bolt 139 is inserted which then locks the mounting plate 43 to the bracket plate 32 in vertical position as best seen in FIGURE 2. Thus when the bolt 139 is installed as described the fluid device 47 becomes inoperative and the spindle 70 of the motor 69 is fixed vertically.

Having now described a preferred embodiment of the invention it can be seen that the objects of the invention have been fully achieved and it must be understood that changes and modifications may be made which do not depart from the spirit of the invention nor from the scope thereof as defined in the appended claims.

What is claimed is:

1. For a router shaper having a power operated angularly displaceable motor carriage with a motor having a rotative cutter element positionable for engagement with a workpiece perpendicular to the tangent line of the surface of said workpiece at the point of contact of the cutter element therewith, a control means for controlling the angular displacement of said power operated motor carriage comprising:
   (a) a servo-valve mounted on said carriage communicatively connected to a source of fluid under pressure and operatively connected to said power operated carriage,
   (b) a sensing shoe supported by said carriage and positioned engageably with said workpiece for actuation thereby according to variations in the surface contour thereof, and
   (c) means operatively connecting said sensing shoe with said servo-valve for actuating said servo-valve responsive to the movement of said shoe
whereby said servo-valve is actuated responsive to a change in the slope of the surface of said workpiece for energizing said power operated carriage in a direction to move said carriage arcuately until the axis of rotation of said cutter element is perpendicular to the tangent line of the surface of said workpiece at said point of contact.

2. For a router shaper having a power operated angularly displaceable motor carriage with a motor having a rotative cutter element positionable for engagement with a workpiece perpendicular to the tangent line of the surface of said workpiece at the point of contact of the cutter element therewith, a control means for controlling the angular displacement of said power operated carriage comprising:
   (a) a servo-valve mounted on said carriage communicatively connected to a source of fluid under pressure and operatively connected to said power operated carriage, and
   (b) a sensing shoe mounted on said servo-valve positioned engageably with the surface of said workpiece and operative to actuate said servo-valve in response to changes in the surface contour of said workpiece,
whereby said servo-valve is actuated responsive to a change in the slope of the surface of said workpiece for energizing said power operated carriage in a direction to move said carriage arcuately until the axis of rotation of said cutter element is perpendicular to the tangent line of the surface of said workpiece at said point of contact.

3. For a router shaper having power operated angularly displaceable motor carriage with a motor having a rotative cutter element positionable for engagement with a workpiece perpendicular to the tangent line of the surface of said workpiece at the point of contact of the cutter element therewith, a control means for controlling the angular displacement of said power operated carriage comprising:
   (a) a servo-valve mounted on said carriage,
   (b) said servo-valve having first fluid passage means connected to a source of fluid under pressure and other passage means operatively connected to said power operated carriage,
   (c) said servo-valve having a movable valve element operative to connect communicatively said passage means for energizing said power operated carriage, and
   (d) a sensing shoe operatively connected to said valve element and positioned engageably with the surface of said workpiece,
whereby said valve element is actuated to connect said passage means responsive to a change in slope of the surface of said workpiece for energizing said power operated carriage in a direction to move said carriage arcuately until the axis of rotation of said cutter element is perpendicular to the tangent line of the surface of said workpiece at said point of contact.

4. For a router shaper having a power operated angularly displaceable motor carriage with a motor having a rotative cutter element positionable for engagement with a workpiece perpendicular to the tangent line of the surface of said workpiece at the point of contact of the cutter element therewith, a control means for controlling the angular displacement of said power operated carriage comprising:
   (a) a servo-valve mounted on said carriage,
   (b) said servo-valve having a body member adjustably secured to said carriage,
   (c) a valve block secured to said body member,
   (d) a movable valve element positioned in co-operative relation with said valve block,
   (e) a first fluid passage in said valve block communicatively connected to a source of fluid pressure,
   (f) a second fluid passage in said valve block operatively connected to energize said power operated carriage in one direction when pressurized from said source,
   (g) a third fluid passage in said valve block operatively connected to energize said power operated carriage in the other direction when pressurized from said source, and
   (h) a sensing shoe operatively connected to said valve element and positioned engageably with the surface of said workpiece
whereby said valve element is actuated to communicate one of said second and third fluid passages with said first passage responsive to a change in slope of the surface of said workpiece for energizing said power operated carriage in a direction to move said carriage arcuately until the axis of rotation of said cutter element is perpendicular to the tangent line of the surface of said workpiece at said point of contact.

5. Control means for a router shaper according to claim 4 wherein said power operated angularly displaceable motor carriage is provided with adjustable dashpot means to regulate the rate of follow-up movement of said carriage responsive to movement of said sensing shoe.

6. Control means for a router shaper according to claim 4 wherein the source of fluid pressure for energizing the power operated angularly displaceable motor carriage is compressed air.

7. For a router shaper having a vertically movable carrier supporting a motor with a rotative cutter element positioned for cutting engagement with a workpiece, a mechanism for positioning the axis of rotation of said cutter element perpendicular to the tangent line of the surface of said workpiece at the point of contact of the cutter element therewith comprising;
   (a) a motor carriage supported on said carrier, said carriage being movable arcuately about a transverse cutting axis, (b) said motor being mounted on said carriage and being positioned with the axis of rotation of said cutter element perpendicular to said cutting axis, the intersection of said cutter element axis and said cutting axis being the point of contact of said cutter element with said workpiece, (c) a fluid actuated device positioned to move said motor carriage arcuately on said carrier, (d) a servo-valve mounted on said motor carriage and operatively connected to a source of fluid under pressure and to said fluid actuated device, and (e) a sensing shoe positioned engageably with said workpiece for sensing the slope of said workpiece surface at said cutting axis, said shoe being operatively connected to said servo-valve, whereby said servo-valve is actuated by said shoe in response to a change in the surface slope of said workpiece for energizing said fluid actuated device in a direction to move said carriage arcuately until the axis of rotation of said cutter element is perpendicular to the tangent line of the surface of said workpiece at said point of contact.

8. For a router shaper having a vertically movable carrier supporting a motor with a rotative cutter element positioned for cutting engagement with a workpiece, a mechanism for positioning the axis of rotation of said cutter element perpendicular to the tangent line of the surface of said workpiece at the point of contact of the cutter element therewith comprising;

(a) a slide-way mounted on said carrier, said slide-way having an arcuate slide surface concentric with a transverse cutting axis which is normal to the axis of said cutter element, (b) a motor carriage supported on said slide-way for movement arcuately about said transverse cutting axis, (c) means for adjustably securing said motor to said carriage for positioning said cutter element with respect to said cutting axis, the intersection of said cutting axis and the axis of the cutter element being the point of contact of said cutter element with said workpiece, (d) a fluid actuated device on said carrier for moving said carriage arcuately on said slide-way, said device comprising a piston rod having one end pivoted on said carrier for swinging movement of the piston rod in a plane parallel with the plane of said slide-way, and a cylinder slidable on said piston rod and having pivoted connection with said carriage, (e) a servo-valve mounted on said carrier for operatively connecting a source of fluid under pressure with said fluid actuated device, and (f) a sensing shoe positioned engageably with said workpiece for sensing the slope of said workpiece at said cutting axis, said shoe being operatively connected to operate said servo-valve whereby said servo-valve is actuated responsive to a change in the slope of said workpiece for energizing said fluid device in a direction to move said carriage arcuately until the axis of rotation of said cutter element is perpendicular to the tangent line of the surface of said workpiece at said point of contact.

References Cited by the Examiner
UNITED STATES PATENTS

| | | | |
|---|---|---|---|
| 527,213 | 10/94 | McClellan | 90—21.5 |
| 1,556,722 | 10/25 | Scott | 90—58 |
| 2,151,078 | 3/39 | Bouvier et al. | 90—13 |
| 2,247,761 | 7/41 | McCoy et al. | 90—13 |
| 2,508,281 | 5/50 | Miller et al. | 90—58 |
| 2,674,926 | 4/54 | Kralowetz | 90—15 |
| 2,793,568 | 5/57 | Martellotti et al. | 90—13 |
| 2,830,502 | 4/58 | Van De Water | 90—13 |
| 2,870,687 | 1/59 | Roberts et al. | 90—13 |
| 3,009,398 | 11/61 | Newton et al. | 90—13 |

WILLIAM W. DYER, JR., *Primary Examiner.*